United States Patent
Togino

(10) Patent No.: US 7,296,901 B2
(45) Date of Patent: Nov. 20, 2007

(54) PROJECTION DISPLAY

(75) Inventor: Takayoshi Togino, Koganei (JP)

(73) Assignee: Olympus Corporation, Tokyo, Shibuya-Ku (JP)

( * ) Notice: Subject to any disclaimer, the term of this patent is extended or adjusted under 35 U.S.C. 154(b) by 328 days.

(21) Appl. No.: 11/146,102

(22) Filed: Jun. 7, 2005

(65) Prior Publication Data

US 2006/0023177 A1  Feb. 2, 2006

(30) Foreign Application Priority Data

Jul. 29, 2004  (JP)  .............. 2004-221211

(51) Int. Cl.
*G03B 21/00* (2006.01)
*G02B 27/22* (2006.01)
*H04N 13/00* (2006.01)
*H04N 15/00* (2006.01)

(52) U.S. Cl. .............. 353/122; 353/31; 359/462; 348/42

(58) Field of Classification Search .............. 353/122, 353/31, 30, 7, 10; 359/462, 478, 376, 385–389; 352/57–65; 348/42–60
See application file for complete search history.

(56) References Cited

U.S. PATENT DOCUMENTS 5,612,817 A * 3/1997 Strahle .............. 359/377

2002/0113941 A1 * 8/2002 Bees .............. 351/200

FOREIGN PATENT DOCUMENTS

| JP | 2003-207743 | 7/2003 |
|----|-------------|--------|
| JP | 2004-102204 | 4/2004 |
| JP | 2004-177920 | 6/2004 |

* cited by examiner

*Primary Examiner*—Melissa Jan Koval
*Assistant Examiner*—Andrew Kong
(74) *Attorney, Agent, or Firm*—Kenyon & Kenyon LLP

(57) ABSTRACT

A projection display comprises a display device, a projection optical system that has an aperture and is adapted to magnify and project an image appearing on the display device and a display panel including an image-formation device located near an image projected through the projection optical system for formation at a viewing pupil position of an aperture image of the projection optical system and a diffuser that has scatter action and is adapted to magnify the aperture image of the projection optical system into left and right viewing pupils. Misalignment warning pupils are adjacent to or overlap partly with the left and right viewing pupils via the display panel, and misalignment warning projectors for issuing a misalignment warning are located on the display panel and adjacent to at least one of the projection optical systems.

6 Claims, 5 Drawing Sheets

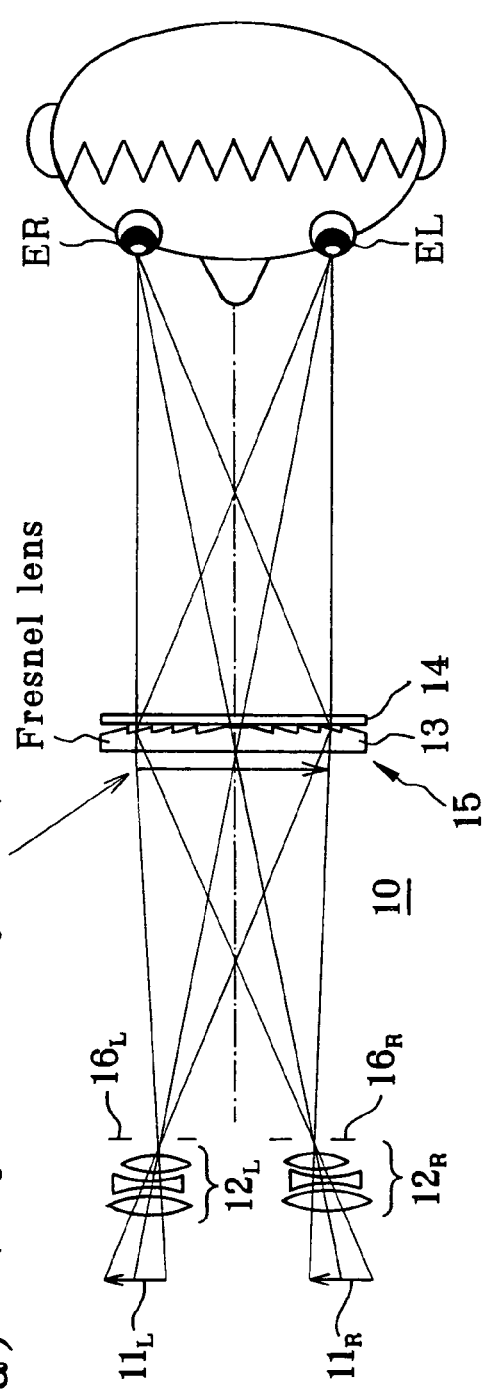
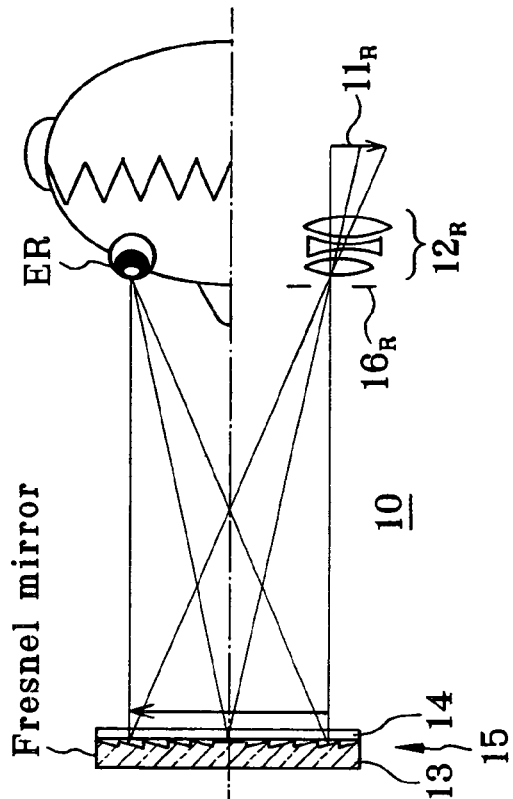
FIG. 4(a)
FIG. 4(b)

Angle of diffusion β

PROJECTION DISPLAY

This application claims benefit of Japanese Application No. 2004-221211 filed in Japan on Jul. 29, 2004, the contents of which are incorporated by this reference.

BACKGROUND OF THE INVENTION

The present invention relates generally to a projection display, and more particularly to a projection display of the type that can project a viewing pupil having a limited area for the purpose of viewing a bright projected image.

The applicant has already filed patent applications concerning the inventions set forth in patent publications 1, 2, 3 or the like to come up with a 2D projection display, a 3D projection display, a projection display that enables a plurality of viewers to view separate projected images, or the like, each of which comprises a single or plural display devices, a single or plural projection optical systems including an aperture (exit pupil) for magnifying and projecting an image appearing on each display device, and a display panel comprising a Fresnel lens or Fresnel mirror located near images projected through such projection optical systems to form an aperture image of each projection optical system at a viewing pupil position and a diffuser plate or a hologram diffuser plate comprising a pit-and-projection diffusing surface having scatter action to magnify the aperture image of each projection optical system. Each one enables a viewer to view a bright projected image while the viewable pupil area is limited.

Patent Publication 1

JP(A) 2003-207743

Patent Publication 2

JP(A) 2004-102204

Patent Publication 3

JP(A) 2004-177920

With such projection displays designed to project the viewing pupil having a limited area, it is impossible to view any bright, normal projected image as the viewer's eyes are off that limited pupil area.

However, as long as one of both eyes of the viewer stays in the viewing pupil area especially in the horizontal direction, it is not necessarily easy for the viewer to take notice of another eye being off the limited pupil area.

SUMMARY OF THE INVENTION

In view of such problems with the prior art as described above, an object of the invention is to provide a projection display for projection of a viewing pupil having a limited area, which permits a viewer to take immediate notice of a viewer's own eye being off the limited pupil area so as to ensure facilitated viewing of a bright, normal projection image.

According to the invention, this object is achievable by the provision of a projection display comprising a single or plural display devices, a single or plural projection optical systems each of which has an aperture and is adapted to magnify and project an image appearing on each display device, and a display panel including image-formation means located near images projected through the projection optical systems for formation at a viewing pupil position of an aperture image of each projection optical system and diffuser means that has scatter action and is adapted to magnify the aperture image of each projection optical system into a viewing pupil, characterized in that:

a misalignment warning pupil is adjacent to or overlaps partly with said viewing pupil via said display panel, and a misalignment warning projector for issuing a misalignment warning is located on said display panel and adjacent to at least one of said projection optical systems.

Preferably in this case, misalignment warning projectors are located adjacent to both left and right sides of at least one of said projection optical systems.

There could also be provided a 3D projection display comprising a left display device for displaying a left parallactic image and a right display device for displaying a right parallactic image as well as a left projection optical system and a right projection optical system, wherein two misalignment warning projectors are located adjacent to both left and right sides of a set of said left and right projection optical systems.

Preferably, a Fresnel lens or mirror is used for the image-formation means.

With the inventive arrangement of the projection display wherein a misalignment warning pupil is adjacent to or overlaps partly with said viewing pupil via said display panel, and a misalignment warning projector for issuing a misalignment warning is located on said display panel and adjacent to at least one of said projection optical systems, it is possible for the viewer to take immediate notice of his or her own eye being off the limited viewing area, so that viewing of a bright, normal projected image can be facilitated.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4(a) and 4(b) are illustrative in schematic of a transmission type 3D projection display and a reflection type 3D projection display, respectively.

DESCRIPTION OF THE PREFERRED EMBODIMENTS

Figure 1:
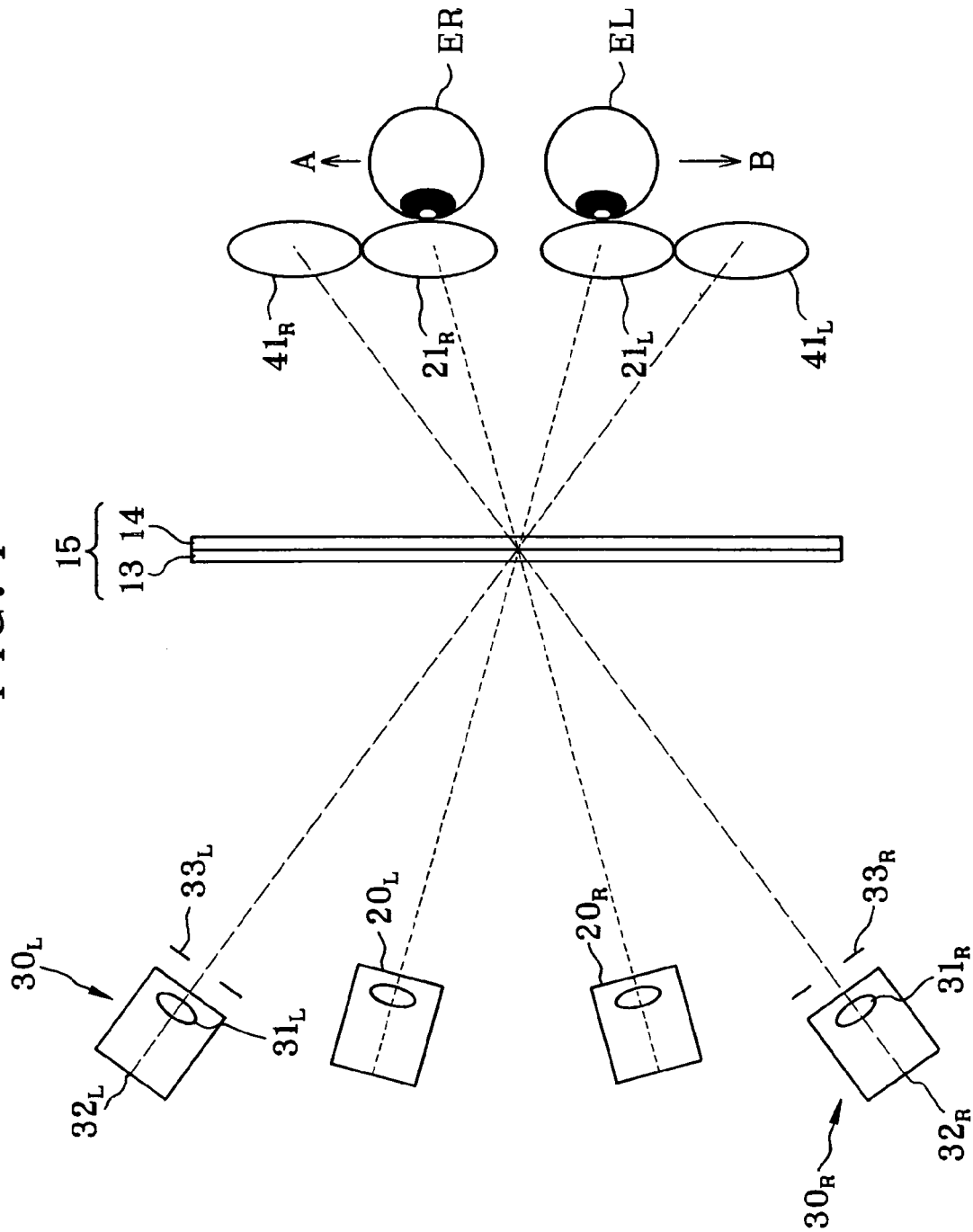
FIG. 1 is illustrative in construction of one embodiment of the projection display according to the invention.

The projection display of the invention is now explained with reference to its preferred embodiments.

FIG. 4 is generally illustrative in construction of one embodiment of the invention, specifically a 3D projection display 10 wherein two left and right 2D parallactic images appearing on two 2D display devices $11_L$, $11_R$ are simultaneously projected onto a display panel 15 for 3D representation. Here FIG. 4(a) is illustrative in schematic of the construction of a transmission type projection display, and FIG. 4(b) is illustrative in schematic of the construction of a reflection type projection display. In FIG. 4(b), for convenience, only the right-eye arrangement is shown; the left-eye arrangement is not shown.

The 3D projection displays 10 shown in FIGS. 4(a) and 4(b) are each made up of display devices $11_L$, $11_R$, projection optical systems $12_L$, $12_R$, an image-formation optical system 13, and a diffuser plate 14 that is in contact with, or slightly spaced away from, the viewing side of the image-formation optical system 13. The image-formation optical system 13 and the diffuser plate 14 form together the display panel 15.

The left and right projection optical systems $12_L$ and $12_R$ are operable to project parallactic images appearing on the left and right display devices $11_L$ and $11_R$ onto the viewing side. Both the optical systems are located such that the parallactic images are projected onto the same display plane of the display panel 15, while the image-formation optical system 13 is located near that same display plane. In this arrangement, the exit pupils $16_L$ and $16_R$ of the projection optical systems $12_L$ and $12_R$ are projected onto the viewing side. As the viewer has left and right eyes EL and ER in alignment with the positions of the projected exit pupil images, it permits the viewer to view the images appearing on the display devices $11_L$ and $11_R$. The diffuser plate 14 acts to magnify the viewing pupils, and the image-formation optical system 13 and the diffuser plate 14 are located on the display plane position.

At the display plane position, the images projected through the projection optical systems $12_L$ and $12_R$ and displayed on the display devices $11_L$ and $11_R$ are formed. For the image-formation optical system 13 located on that image-formation position, a Fresnel lens (convex lens) is used in the case of the transmission type 3D projection display (FIG. 4(a)), and a Fresnel mirror (concave mirror) in the case of the reflection type 3D projection display (FIG. 4(b)). The diffuser plate 14, for instance, may be a diffuser plate comprising a transparent substrate roughened on its surface to impart directivity thereto, a directional HOE scatter film, or a directional diffusing plane formed on the entrance surface of the Fresnel mirror or the exit surface of the Fresnel lens.

The Fresnel mirror, and the Fresnel lens is adapted to form the images of two exit pupils $16_L$ and $16_R$ on the viewing side. Each Fresnel plane is located at (or near) the display plane position, so that the projected image can be viewed with high resolution yet with no quality deterioration. The Fresnel mirror, and the Fresnel lens is located in a flat sheet form unlike a concave mirror.

Figure 5A:
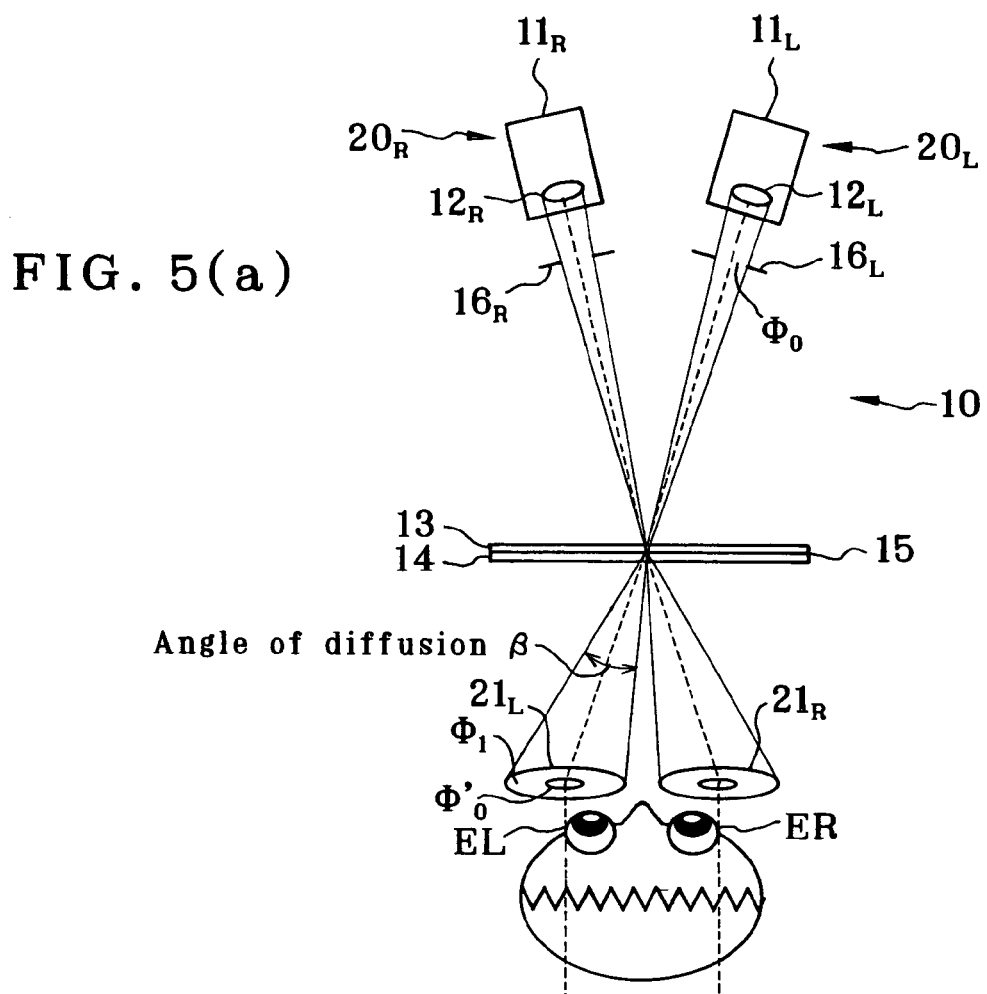
FIGS. 5(a), 5(b) and 5(c) are illustrative of the principles of how an exit pupil image (viewing image) is magnified in the 3D projection displays of FIGS. 4(a) and 4(b).

FIG. 5(a) is illustrative of the principles of how exit pupil images (viewing pupils) $21_L$ and $21_R$ are magnified in the 3D projection display 10 that is of the transmission type.

A diffuser plate 14 is located together with an image-formation optical system 13 at or near a planar form of display surface position of a display panel 15. In FIG. 5(a), the image-formation optical system 13 acts to form the images of exit pupils $16_L$ and $16_R$ of left and right projection optical systems $12_L$ and $12_R$ at given positions on the viewing side with the diameter, $\Phi_0$, of the exit pupils $16_L$ and $16_R$ changed to a magnitude of $\Phi_0'$. At the ext pupil image position, the eyeballs EL and ER of the viewer are located. Here, the diffuser plate 14 is designed to make use of its diffusion action to magnify the images of the exit pupils $16_L$ and $16_R$ (the images of the exit pupils $16_L$ and $16_R$ of the left and right projection optical systems $12_L$ and $12_R$)—which should be formed with the magnitude of $\Phi_0'$— to viewing pupils $21_L$ and $21_R$ having a magnitude of $\Phi_1'$. It is noted that the left and right viewing pupils $21_L$ and $21_R$ magnified through the diffuser plate 14 are determined in terms of position and diameter in such a way as not to overlap each other. The diffuser plate 14 has only one diffusion action in the case of the transmission type 3D projection display because light transmits only once through the diffuser plate 14 located at the display plane position, and double diffusion actions in the case of the reflection type 3D projection display (not shown in FIG. 5), because light transmits twice through a diffusing optical system located at the display plane position.

Figure 5B:
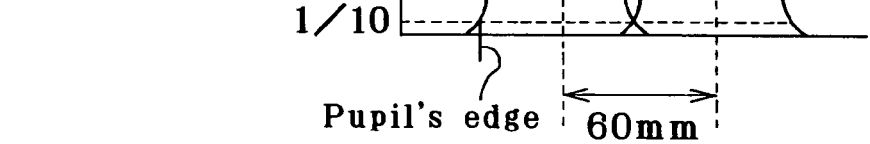
Figure 5C:
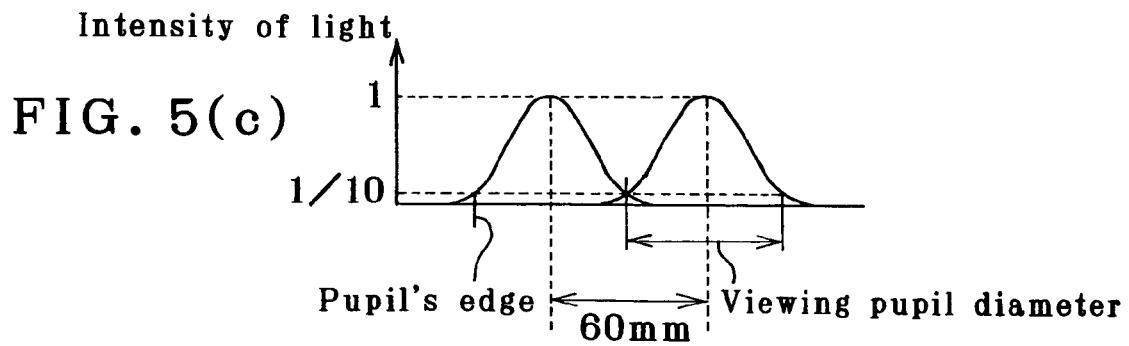

FIGS. 5(b) and 5(c) are illustrative of brightness distributions in left and right viewing pupils $21_L$ and $21_R$. An in-pupil distribution is of two types, i.e., a uniform type as depicted in FIG. 5(b) and a type approximate to Gaussian distribution as depicted in FIG. 5(c). In any event, light intensity at a site where the left and right pupils overlap each other should be small enough to substantially eliminate any overlap. It is thus possible to present images at left and right projectors $20_L$ and $20_R$ to the left and right pupils EL and ER of the viewer in a mutually independent state, making 3D viewing possible without recourse to spectacles.

FIG. 1 is illustrative in construction of one embodiment of such a 3D projection display wherein a misalignment warning is indicated on the outside of viewing pupils $21_L$ and $21_R$ according to the invention. This 3D projection display is designed in the form of a transmission type 3D projection display as in FIG. 4(a). In this transmission type 3D projection display, how left and right projectors $20_L$, $20_R$ and a display panel 15 are constructed, and what relations they are located in is the same as in FIG. 4(a), and in the left and right projectors $20_L$ and $20_R$, the associated left and right projection optical systems $12_L$ and $12_R$ are adapted to project parallactic images appearing on the associated display devices $11_L$ and $11_R$ onto the same display plane of the display panel 15, as shown in FIG. 4(a). An image-formation optical system 13 in the display panel 15 is adapted to project the exit pupils $16_L$ and $16_R$ of the projection optical systems $12_L$ and $12_R$ on the viewing side. A diffuser plate 14 in the display panel 15 is adapted to magnify the pupil images of the exit pupils $16_L$ and $16_R$ to viewing pupils $21_L$ and $21_R$. As the viewer has the pupils EL and ER of the left and right eyes positioned in the magnified and projected viewing pupils $21_L$ and $21_R$, the viewer can obtain a 3D viewing of images appearing on the display devices $11_L$ and $11_R$. According to the invention, a separate projector $30_L$ is located on the outside of the left projector $20_L$ (the side that faces away from the right projector $20_R$), and a separate projector $30_R$ is located on the outside of the right projector $20_R$ (the side that faces away from the left projector $20_L$). The left- and right-outer projectors $30_L$ and $30_R$ have the same construction, and each one comprises projection optical systems $31_L$ and $31_R$ having exit pupils $33_L$ and $33_R$, respectively, and display portions $32_L$ and $32_R$. The display portions $32_L$ and $32_R$, when having no self-emitter, may have an illumination system (not shown).

The left- and right-outer projectors $30_L$ and $30_R$ are located such that the exit pupils $33_L$ and $33_R$ thereof are magnified and projected by way of the actions of an image-formation optical system 13 and a diffuser plate 14 that form together the display panel 15 to form warning pupils $41_L$ and $41_R$ that are adjacent to, or overlap slightly with, the outside of the viewing pupils $21_L$ and $21_R$. Projection optical systems $31_L$ and $31_R$ in the left- and right-outer projectors $30_L$ and $30_R$ are adapted to project images of markings, characters or colors displayed on the associated display portions $32_L$ and $32_R$ onto the same display plane of the display panel 15 for the parallactic images. The markings, characters or colors displayed on the display portions $32_L$ and $32_R$ will be explained later.

Such being the arrangement, as long as the pupils EL and ER of both eyes of the viewer are positioned within the left and right viewing pupils $21_L$ and $21_R$, the viewer can view normal left and right parallactic images for normal 3D viewing.

Consider now that the head of the viewer moves in an arrow A direction and the right-eye ER is on the verge of coming off the right viewing pupil $21_R$. Then, the pupil of the right-eye ER receives a part of light coming from a right warning pupil $41_R$ adjacent thereto, so that the viewer can see the markings, characters or colors displayed on the display portion $32_R$ in the right-outer projector $30_R$. Here, if on the display portion $32_R$ there is indicated a word of warning such as "Move over to the right", an arrow pattern with projected images turning right on the display panel 15 or a simple across-the-plane red color, then the viewer can see such a word, arrow pattern or red color through the right eye EL. As a result, the viewer can take notice of the head being too close to the right in the arrow A direction to allow it to go back to the normal position.

Conversely, consider that the head of the viewer moves in an arrow B direction and the left-eye EL is on the verge of coming off the left viewing pupil $21_L$. Then, the pupil of the left-eye EL receives a part of light coming from a left warning pupil $41_L$ adjacent thereto, so that the viewer can see the markings, characters or colors displayed on the display portion $32_L$ in the left-outer projector $30_L$. Here, if on the display portion $32_L$ there is indicated a word of warning such as "Move over to the right", an arrow pattern with projected images turning left on the display panel 15 or a simple across-the-plane blue color, then the viewer can see such a word, arrow pattern or blue color through the left-eye EL. As a result, the viewer can take notice of the head being too close to the left in the arrow B direction to allow it to go back to the normal position.

While a set of the projectors $30_L$ and $30_R$ for warning that the eyes of the viewer are off the normal position is located on the outside of the displaying projectors $20_L$ and $20_R$ in the above embodiment, it is understood that another set of similar projectors could be located in the vertical direction to warn that both eyes are off the normal position not only in the left-and-right direction but also in the vertical direction.

While the above embodiment has been explained with reference to the application of the warning projectors $30_L$ and $30_R$ to the transmission type 3D projection display, it is understood that they could also be applied to the reflection type projection display.

Further, warning projectors similar to the projectors $30_L$ and $30_R$ could be applied to a 2D projection display including only one displaying projector with only one viewing pupil being formed. That is, they could be located on the left and right sides, and optionally on the upper and lower sides, of the displaying projector to warn that the eyes of the viewer are off the normal positions.

Figure 2:
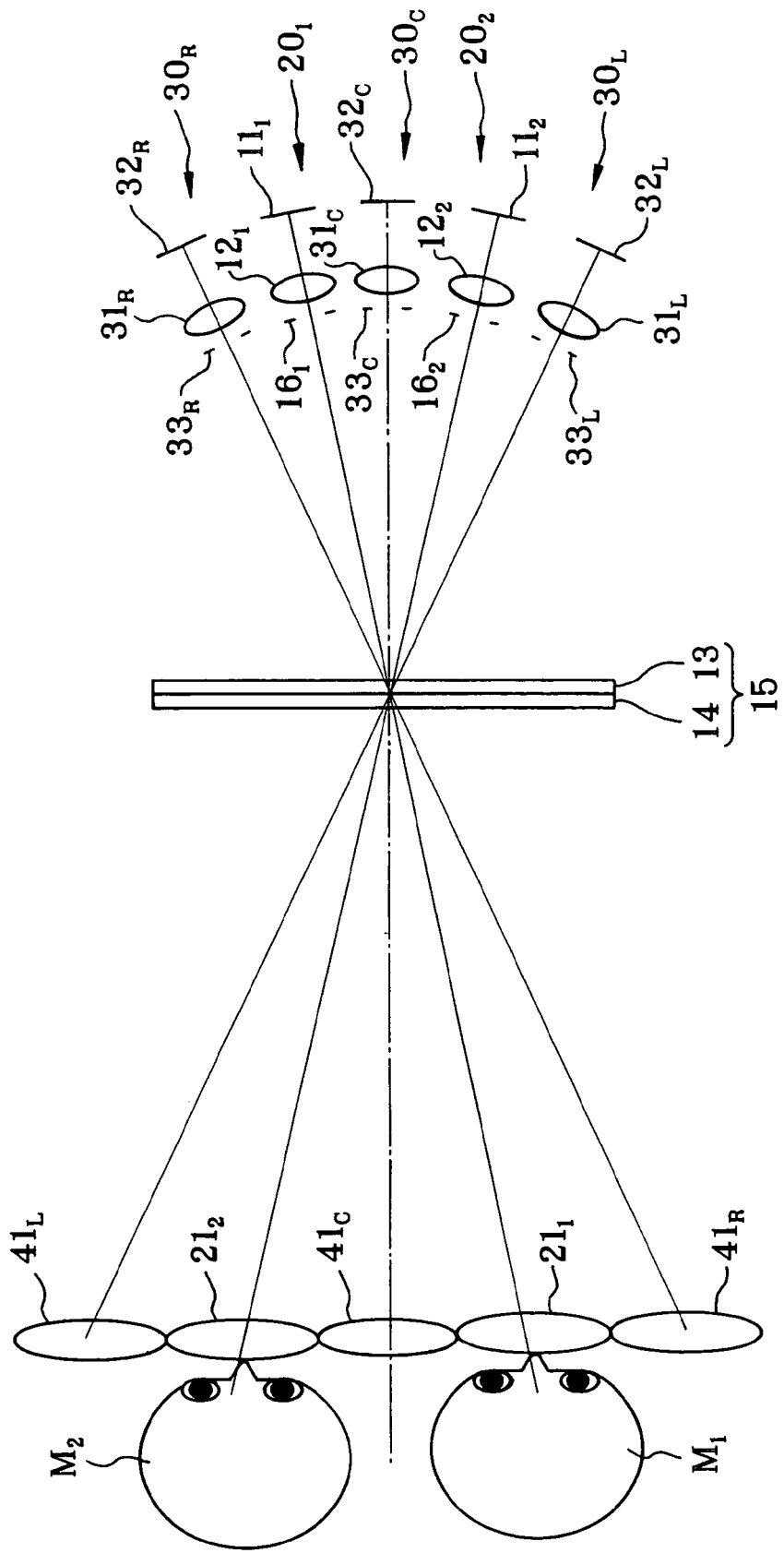
FIG. 2 is illustrative in construction of another embodiment of the projection display according to the invention.

Referring then to FIG. 2, there is shown one construction of another embodiment of the projection display according to the invention. Specifically, misalignment warning projectors are located on the outside of viewing pupils $21_1$ and $21_2$ in a projection display that enables a plurality of viewers to view separate projected images. That projection display for presenting separate projected images to a plurality of viewers is analogous to the 3D projection display of FIG. 1. That is, the constructions of a plurality of separate projectors $12_1$ and $12_2$ and display panel 15 and how they are located are pretty much the same as in FIG. 4(a). As shown in FIG. 2, projection optical systems $12_1$ and $12_2$ in a plurality (two in FIG. 2) of separate projectors $20_1$ and $20_2$ are adapted to project separate 2D images appearing on the associated display devices $11_1$ and $11_2$ onto the same display plane of the display panel 15. An image-formation optical system 13 in the display panel 15 projects the exit pupils $16_1$ and $16_2$ of the projection optical systems $12_1$ and $12_2$ onto the viewer side, and a diffuser plate 14 in the display panel 15 magnifies the pupil images of the exit pupils $16_1$ and $16_2$ to viewing pupils $21_1$ and $21_2$. As separate viewers $M_1$ and $M_2$ have the pupils of both eyes positioned within the respective magnified and projected viewing pupils $22_1$ and $22_2$, they can separately view mutually different images appearing on the display devices $11_1$ and $11_2$.

Then, a projector $30_R$ similar to the warning projector $30_R$ of FIG. 1 is located on the outside of one projector $20_1$ (the side that faces away from another projector $20_2$), and an exit pupil $33_R$ of a projection optical system $31_R$ thereof is magnified and projected under the actions of the image-formation optical system 13 and diffuser plate 14 in the display panel 15 into a warning pupil $41_R$ that is adjacent to, or overlaps slightly with, the outside of the viewing pupil $21_1$ for the one projector $20_1$. Likewise, a projector $30_L$ similar to the warning projector $30_L$ of FIG. 1 is located on the outside of another projector $20_2$ (the side that faces away from the one projector $20_1$), and an exit pupil $33_L$ of a projection optical system $31_L$ thereof is magnified and projected under the actions of the image-formation optical system 13 and diffuser plate 14 in the display panel 15 into a warning pupil $41_L$ that is adjacent to, or overlaps slightly with, the outside of the viewing pupil $21_2$ for the another projector $20_2$.

In this embodiment, yet another projector $30_C$ is also located between both projectors $20_1$ and $20_2$, and an exit pupil $33_C$ of a projection optical system $31_C$ thereof is magnified and projected under the actions of the image-formation optical system 13 and diffuser plate 14 in the display panel 15 into a warning pupil $41_C$ that is interposed between the viewing pupils $21_1$ and $21_2$ for both projectors $20_1$ and $20_2$ and is adjacent to, or overlaps slightly with, them.

As is the case with the embodiment of FIG. 1, markings, characters or colors similar to those mentioned above are indicated on display portions $32_L$, $32_C$ and $32_R$ of the warning projectors $30_L$, $30_C$ and $30_R$, so that, as long as the eyes of the viewers $M_1$ and $M_2$ are positioned within the associated viewing pupils $21_1$ and $21_2$, they can obtain a normal 3D viewing of the normal left and right parallactic images. However, as the eyes are on the verge of being off the viewing pupils $21_1$ and $21_2$ in any of the left and right directions, the eye of any of the viewers $M_1$ and $M_2$ receives a part of light coming from any one of the warning pupils $41_L$, $41_C$ and $41_R$ adjacent thereto, so that they can see the markings, characters or colors indicated on the display portions $32_L$, $32_C$ and $32_R$ of the associated projectors $30_L$, $30_C$ and $30_R$. Consequently, each of the viewers $M_1$ and $M_2$ can take notice of the head being off the viewing position to allow it to go back to the normal position.

Figure 3:
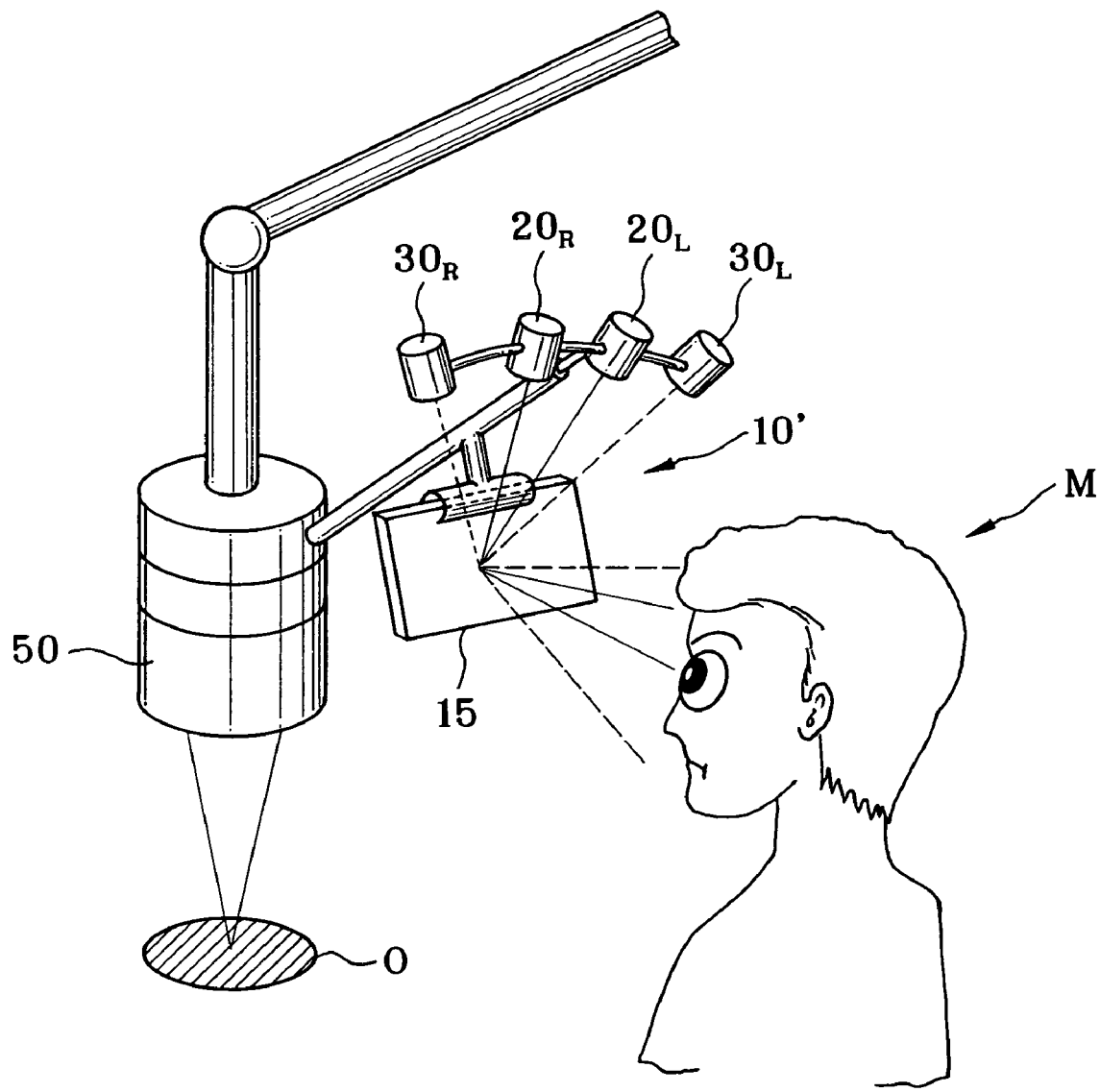
FIG. 3 is illustrative in schematic of a display device in a surgical stereomicroscope, to which the inventive projection display is applied.

FIG. 3 is illustrative in schematic of the inventive projection display as applied to a display device in a surgical stereomicroscope. Operation or the like is performed while an affected site O is viewed under a surgical stereomicroscope 50. A reflection type 3D projection display 10' according to the invention is affixed to the surgical stereomicroscope 50, and the principles of 3D representations by the reflection type 3D projection display are the same as in FIG. 4(b). As in FIG. 1, warning projectors $30_L$ and $30_R$ are located on both sides of a set of left and right projectors $20_L$ and $20_R$ in the reflection type projection display 10', so that a viewer M can take notice of being off a 3D viewing position to go back to the normal viewing position for ensuring a proper 3D viewing of the affected site O.

While the inventive projection display has been explained with reference to some preferred embodiments, it is understood that the invention is by no means limited thereto, and many modifications may be possible.

What we claim is:

1. A projection display comprising a single or plural display devices, a single or plural projection optical systems each of which has an aperture and is adapted to magnify and project an image appearing on each display device, and a display panel including image-formation means located near images projected through the projection optical systems for formation at a viewing pupil position of an aperture image of each projection optical system and diffuser means that has scatter action and is adapted to magnify the aperture image of each projection optical system into a viewing pupil, wherein:

a misalignment warning pupil is adjacent to or overlaps partly with said viewing pupil via said display panel, and a misalignment warning projector for issuing a misalignment warning is located on said display panel and adjacent to at least one of said projection optical systems.

2. The projection display according to claim 1, wherein misalignment warning projectors are located adjacent to both left and right sides of at least one of said projection optical systems.

3. The projection display according to claim 2, wherein said image-formation means comprises a Fresnel lens or a Fresnel mirror.

4. The projection display according to claim 1, which comprises a left display device for displaying a left parallactic image and a right display device for displaying a right parallactic image as well as a left projection optical system and a right projection optical system, wherein two misalignment warning projectors are located adjacent to both left and right sides of a set of said left and right projection optical systems.

5. The projection display according to claim 4, wherein said image-formation means comprises a Fresnel lens or a Fresnel mirror.

6. The projection display according to claim 1, wherein said image-formation means comprises a Fresnel lens or a Fresnel mirror.

* * * * *